US009118761B1

(12) United States Patent
Nuñez, III (10) Patent No.: US 9,118,761 B1
(45) Date of Patent: *Aug. 25, 2015

(54) COMPUTING DEVICE ASSISTANCE FOR PHONE BASED CUSTOMER SERVICE REPRESENTATIVE INTERACTION (71) Applicant: United Services Automobile Association (USAA), San Antonio, TX (US)

(72) Inventor: Antonio M. Nuñez, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,214

(22) Filed: Mar. 19, 2013

Related U.S. Application Data (63) Continuation of application No. 12/973,831, filed on Dec. 20, 2010, now Pat. No. 8,401,171.

(51) Int. Cl.
H04M 3/00 (2006.01)
H04M 3/51 (2006.01)

(52) U.S. Cl.
CPC ...................... *H04M 3/51* (2013.01)

(58) Field of Classification Search
USPC ..................... 379/265.09; 709/208
See application file for complete search history.

(56) References Cited

U.S. PATENT DOCUMENTS

| 7,277,726 | B2 | 10/2007 | Ahya et al. |
| 7,287,054 | B2 | 10/2007 | Lee et al. |
| 7,296,002 | B2 | 11/2007 | Shafiee et al. |
| 7,401,294 | B2 | 7/2008 | Chang et al. |
| 7,698,660 | B2 | 4/2010 | Sanchez et al. |
| 7,729,366 | B2 | 6/2010 | Mok et al. |
| 8,010,901 | B1 | 8/2011 | Rogers |
| 8,401,171 | B1 | 3/2013 | Nuñez, III |
| 2002/0080757 | A1 | 6/2002 | Narvanen et al. |
| 2003/0097448 | A1 | 5/2003 | Menezes et al. |
| 2004/0133668 | A1 | 7/2004 | Nicholas |
| 2004/0176963 | A1 | 9/2004 | Vallerand |
| 2005/0033843 | A1 | 2/2005 | Shahi et al. |
| 2005/0050462 | A1 | 3/2005 | Whittle et al. |

(Continued)

OTHER PUBLICATIONS

"Mobile Mulitmodal Service for a 3G Terminal" [Retrieved on Nov. 3, 2010], Retrieved from the Internet <URL:http://daim.idi.ntnu.no/masteroppgaver/IME/ITEM/2006/1266/masteroppgave.pdf>, 107 pgs.

(Continued)

*Primary Examiner* — Quynh Nguyen
(74) *Attorney, Agent, or Firm* — Fish & Richardson P.C.

(57) ABSTRACT

Systems and methods for computing device assistance for phone based customer service representative interaction are described herein. One or more systems include a number of customer service representative computing devices having processors and memory thereon for the storage of executable instructions and data, wherein the instructions are executed to allow at least one of the number of computing devices to control a customer's computing device such that the customer service representative or executable instructions can select information, related to a phone based customer service representative interaction, to display on the customer's computing device and display the selected information on a display of the customer's computing device.

20 Claims, 7 Drawing Sheets

(56) References Cited

U.S. PATENT DOCUMENTS

| | | |
|---|---|---|
| 2005/0091316 A1 | 4/2005 | Ponce et al. |
| 2005/0097311 A1 | 5/2005 | Gopalakrishnan et al. |
| 2005/0125348 A1 | 6/2005 | Fulton et al. |
| 2005/0165719 A1 | 7/2005 | Greenspan et al. |
| 2005/0192872 A1 | 9/2005 | Spetner |
| 2005/0246422 A1 | 11/2005 | Laning |
| 2005/0259618 A1 | 11/2005 | Ahya et al. |
| 2005/0267870 A1 | 12/2005 | Everett-Church et al. |
| 2006/0129487 A1 | 6/2006 | Shafiee et al. |
| 2007/0022158 A1 | 1/2007 | Vasa |
| 2007/0043967 A1 | 2/2007 | Stone-Kaplan et al. |
| 2008/0040436 A1 | 2/2008 | Setlur et al. |
| 2008/0184128 A1 | 7/2008 | Swenson et al. |
| 2008/0263139 A1 | 10/2008 | Martin |
| 2010/0087175 A1 | 4/2010 | Roundtree |
| 2010/0241507 A1 | 9/2010 | Quinn et al. |
| 2010/0246800 A1 | 9/2010 | Geppert et al. |
| 2012/0042367 A1 | 2/2012 | Papakostas et al. |
| 2012/0045049 A1 | 2/2012 | Yoakum |
| 2012/0047469 A1 | 2/2012 | Chelaru et al. |
| 2012/0099720 A1 | 4/2012 | Soundar |

OTHER PUBLICATIONS

Grundy, J., et al., Experiences developing a thin-client, multi-device travel planning application Downloaded on Aug. 27, 2008; Downloaded from the internet at URL <http://www.cs.auckland.ac.nzl-john-g/papers/chinz2002.pdf>.

COMPUTING DEVICE ASSISTANCE FOR PHONE BASED CUSTOMER SERVICE REPRESENTATIVE INTERACTION

CROSS-REFERENCE TO RELATED APPLICATIONS

This application is a Continuation of U.S. patent application Ser. No. 12/973,831 filed on Dec. 20, 2010, now U.S. Pat. No. 8,401,171, which is herein incorporated by reference.

TECHNICAL FIELD

The present disclosure relates to systems and methods for computing device assistance for phone based customer service representative interaction.

BACKGROUND

Interactions between customers and phone based customer service representatives (CSR) can be difficult in some instances. For example, customers that do not speak clear English may have difficulties with an English based voice analysis system (e.g., "say one for your account balance"). Additionally, information may be difficult to convey over a phone line. For example, a terms and conditions paragraph may require the reading of the entire paragraph by the CSR which may be tiresome for the customer, making the experience difficult and unenjoyable.

DETAILED DESCRIPTION

The present disclosure relates to systems and methods for computing device assistance for phone based customer service representative interaction. One or more systems include a number of customer service representative computing devices having processors and memory thereon for the storage of executable instructions and data, wherein the instructions are executed to allow at least one of the number of computing devices to control a customer's computing device such that the customer service representative or executable instructions can select information, related to a phone based customer service representative interaction, to display on the customer's computing device and display the selected information on a display of the customer's computing device.

Systems and methods in accordance with one or more embodiments of the present disclosure can be utilized to aid a customer, for example, in interacting with a customer service representative that may be located remotely from the customer and therefore accessible via phone. This may be beneficial in improving the ability for the customer service representative to communicate information to the user as information can be shown on the display of the customer's computing device.

Other benefits can, for example, include enabling the customer service representative to provide a greater amount of information to the user, such as, for example, policy changes and/or terms and conditions that may have had to have been read by the customer service representative in previous approaches. Additional information about the customer's account can be provided during the transaction that may provide context information (e.g., a term summary of the account being discussed showing balance, credit available, and/or interest rate) that can be referred to by the customer regarding the customer's current interaction with the customer service representative. Such systems and methods may also allow for other offers to be presented to the customer during the interaction (e.g., an offer for an upgraded product or additional product) with the customer service representative.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIGS. 2A-2D.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of computing devices" can refer to one or more computing devices.

Figure 1:
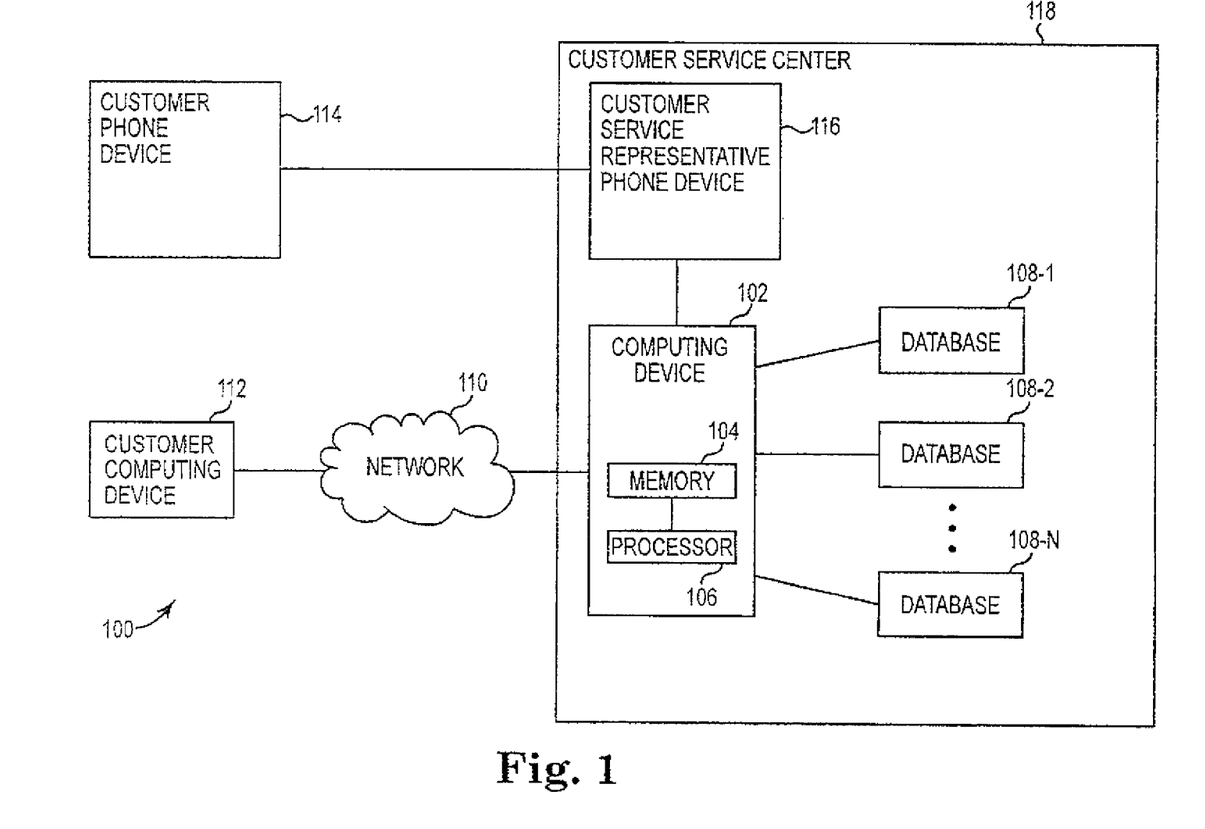
FIG. 1 illustrates a system that can be used in accordance with one or more embodiments of the present disclosure.

FIG. 1 illustrates a system that can be used in accordance with one or more embodiments of the present disclosure. In the embodiment illustrated in FIG. 1, the system 100 is provided for computing device assistance for phone based customer service representative interaction that takes place, for example, between a customer on a customer phone device 114 and a customer service representative via a customer service representative phone device 116, for instance, located at a customer service center 118.

Examples of the customer phone device include a land line phone or mobile phone and could be a smart phone having phone and network capabilities. In some embodiments, the customer service representative could be located in other locations, such as, for example, in a bank branch location.

A phone call can be initiated by either the customer or the customer service representative and a phone based interaction dialog begins. The customer and customer service representative can begin discussing an issue in which it would be helpful to provide information to the customer via a computing device (e.g., an issue with an insurance product such as a policy change or a banking product such as a balance transfer or bill payment).

At this point, a computing device interaction can also be initiated to supplement the phone interaction. It should be noted that a computing device interaction can be started at any point during the phone interaction between the customer and the customer service representative.

In the embodiment of FIG. 1, a computing device interaction is created between customer computing device 112 and a customer service representative's computing device 102. In some embodiments, the customer service center can have multiple computing devices having processors and memory thereon for the storage of executable instructions and data that can be utilized by the customer service representative.

The instructions can be executed to, for example, allow at least one of the number of customer service representative computing devices (e.g., computing device 102) to control a customer's computing device 112 such that the customer service representative or executable instructions (e.g., provided on computing device 102) can select information, related to the phone based customer service representative interaction, to display on the customer's computing device 112 and display the selected information on a display of the customer's computing device 112.

As shown in FIG. 1, system 100 includes a customer service center 118 that includes a number of customer service representative phone devices (e.g., customer service representative phone device 116) and a number of computing devices (e.g., computing device 102). Although the embodiment illustrated in FIG. 1 includes one customer service representative phone device and one computing device, embodiments of the present disclosure are not so limited, and can include any number of customer service representative phone devices and computing devices.

The computing devices can include, for example, a number of processors (e.g., processor 106) and memory (e.g., memory 104) coupled to the processors. The system can also include a number of databases. In the embodiment of FIG. 1, several databases 108-1, 108-2, . . . 108-N are illustrated. Such databases are also forms of memory, but are typically used to store data, but are not limited to storing data therein. It should be noted, that the use of the identifier N herein with regard to a number of items indicates that any number of items may be used.

Memory 104 can be volatile or nonvolatile memory. Memory 104 can also be removable, e.g., portable memory, or non-removable, e.g., internal memory. For example, memory 104 can be random access memory (RAM) or read-only memory (ROM).

Memory 104 can, for example, be dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 104 is illustrated as being located in computing device 102, embodiments of the present disclosure are not so limited. For example, memory 104 can also be located internal to another computing resource, e.g., enabling computer readable instructions to be downloaded over a network, such as the Internet, or another wired or wireless connection.

Memory 104 can store executable instructions, such as, for example, computer readable instructions (e.g., software). Processor 106 can execute the executable instructions stored in memory 104.

In one or more embodiments of the present disclosure, computing device 102 can communicate information stored in memory, such as memory 104 or databases 108-1, 108-2, . . . , 108-N, to the customer computing device 112. Computing device 102 can communicate this information via a network 110, such as, for example, a wide area network (WAN) such as the Internet, a local area network (LAN), a personal area network (PAN), a campus area network (CAN), or metropolitan area network (MAN), among other types of networks.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations.

A network may provide connections to the Internet and/or to the networks of other entities (e.g., organizations, institutions, etc.). Users may interact with network-enabled software applications to make a network request, such as to get a file from other network resources. For instance, applications may also communicate with network management software, which can interact with network hardware to transmit information between devices on the network.

The customer's computing device 112 can be any suitable computing device and can also include a processor and memory thereon or associated therewith (not shown in FIG. 1). For example, one suitable device would be a portable computing device.

In some embodiments, the device may have a touch screen display (e.g., such as the device illustrated in FIGS. 2A-2D) thereby allowing the customer to interact with the information displayed by the customer service representative or executable instructions. In some embodiments, the computing device can be a smart phone wherein the phone based interaction and the computer based interaction can happen on the same device.

In some embodiments, the user can sign up for the added computing device interaction capability and download executable instructions to allow the customer service representative's computing device 102 to have access to the customer's computing device 112. This can be accomplished, for example, before any such customer service interactions occur (e.g., the customer may elect the option when accounts or products are initially opened or purchased or the election could be made via a website after the opening of an account or purchase of a product) or the election can be made during the phone interaction with the customer service representative.

In various embodiments, the system 100 can receive an authority confirmation from the customer to authorize the customer service representative's computing device 102 to access the customer's computing device 112 to display the selected information on the customer's computing device 112 (e.g., on a display of the customer's computing device 112). In various embodiments, at least one of the number of customer service representative computing devices (e.g., customer service representative's computing device 102) sends a request for authorization to access the customer's computing device 112 to the customer.

Once the computing device interaction between the customer service representative's computing device 102 and the customer's computing device 112 has been established, the customer service representative can select information to be sent to the customer's computing device 112. In some embodiments, the selection of the information can be made before the establishment of the computing device interaction and, in some embodiments, executable instructions can use the selection of the information to be sent via a computing device interaction as a trigger to initiate such an interaction between the customer service representative's computing device 102 and the customer's computing device 112.

The information that can be provided to the customer's computing device 112 can be any information that may better provided by a computing device rather than via phone (e.g., via voice). For example, the information can be duplicative of information conveyed by phone or can be additional or supplemental information.

Figure 2A:
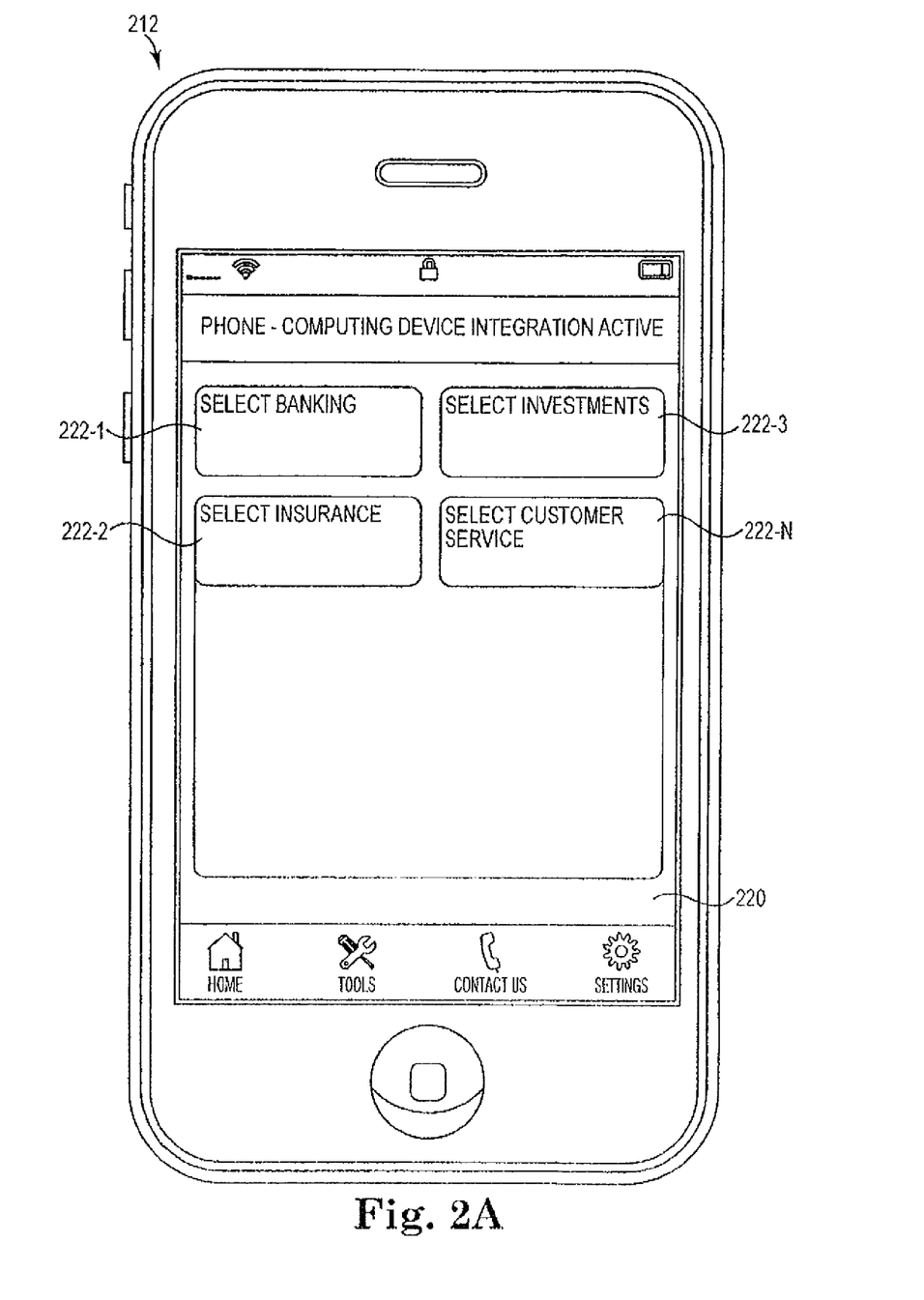
FIG. 2A illustrates a display of a user device having information provided in accordance with one or more embodiments of the present disclosure.

Information can also be conveyed in various forms, such as by use of icons, such as buttons, or text. For example, in some embodiments, the selected information can be one or more buttons to allow the customer to make a selection of one or more actions that can be taken during the customer service representative interaction. FIG. 2A illustrates one such implementation of a computing device interaction.

FIG. 2A illustrates a display of a user device having information provided in accordance with one or more embodiments of the present disclosure. In the embodiment of FIG. 2A, a customer's computing device 212 is illustrated. Customer's computing device 212 can be, for example, customer's computing device 112 previously described in connection with FIG. 1.

On the display 220 of the device 212, a number of buttons 222-1, 222-2, 222-3, . . . 222-N are provided. These buttons can provide information regarding the phone interaction taking place with a customer service representative (e.g., the customer service representative previously described in connection with FIG. 1). As used herein, the term customer service representative can include automated customer service systems, for example, those utilizing voice recognition software or touch pad interaction among other such systems.

The buttons in the present example can allow a user to select the nature of their communication, namely, banking 222-1, insurance 222-2, investments 222-3, and customer service 222-N. As discussed above, such embodiments may be beneficial for users who have difficulty navigating phone based customer service systems due, for example, to speech or language issues, among other benefits.

Figure 2B:
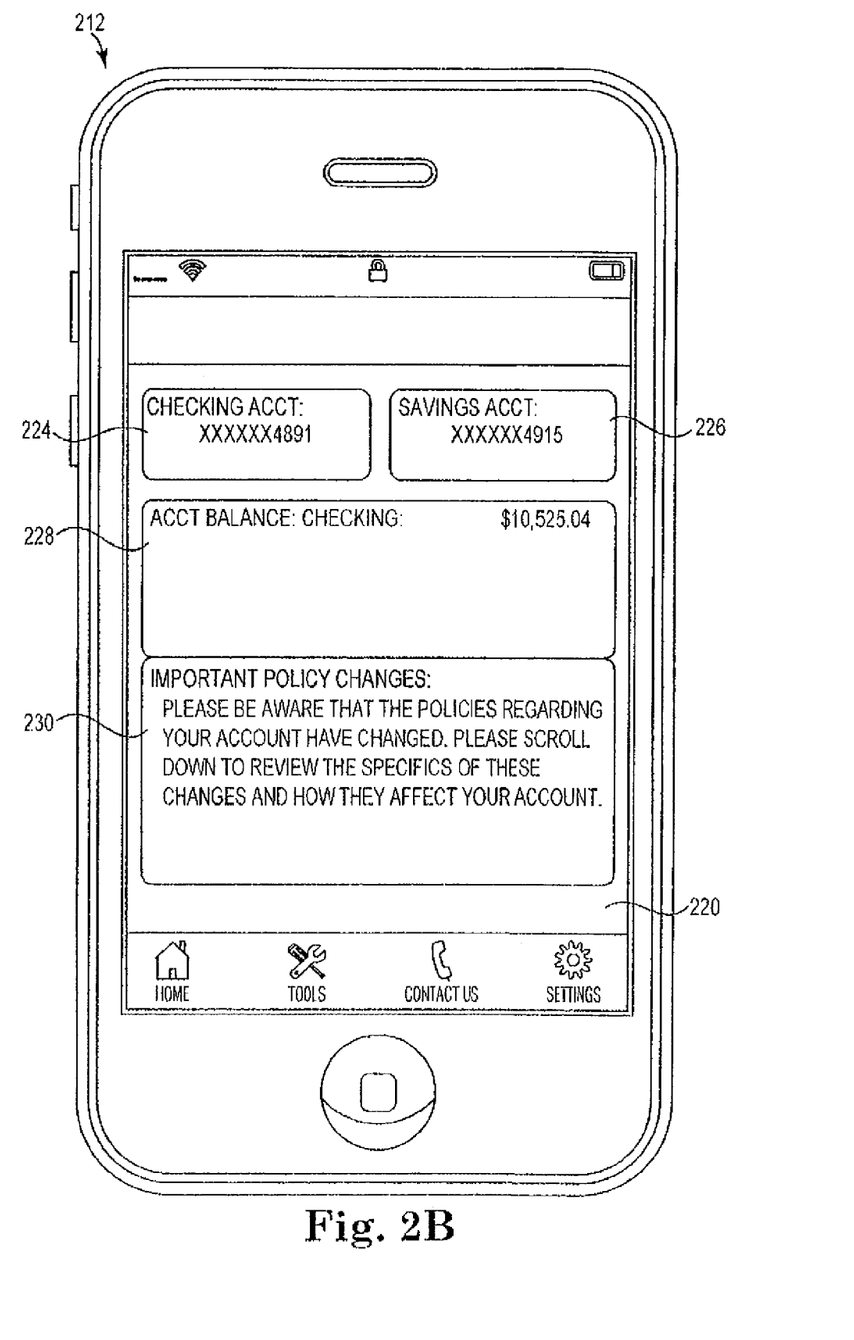
FIG. 2B illustrates a display of a user device having another set of information provided in accordance with one or more embodiments of the present disclosure.

FIG. 2B illustrates a display of a user device having another set of information provided in accordance with one or more embodiments of the present disclosure. In this example, the upper portion of the display 220 of the device 212 provides general information about one or more of the products being discussed or to be discussed (in this case a banking product) during the phone interaction between the customer service representative and the customer. This information (e.g., checking account information 224 and 228 and savings account information 226) may provide the customer some context when discussing options (e.g., paying bills, opening new accounts, transferring funds, etc.) with the customer service representative during the phone interaction, among other benefits.

In this example, the screen has been bifurcated and the lower portion of the screen 230 provides policy information that the customer can read to understand changes to their policy that may affect their decisions when talking with the customer service representative. The providing of such information on the display of the computing device can have a number of benefits.

For example, if the interaction between the customer and the customer service representative were only taking place via phone (e.g., via voice), the customer service representative would have to read the entire document to the customer which would take time to do so and may be difficult for the customer to follow. Additionally, the customer now has a copy of the policy changes document that they can review and to add to their file of banking information they may be keep so they can reference it later and the customer service representative has a record that the customer has received a copy which may be helpful if a dispute arises over a policy change, among other benefits.

Additionally, in some embodiments, executable instructions can be utilized to allow the customer to review and sign the document (e.g., electronically) regarding a subject being discussed via the phone by the customer service representative and the customer. This can be accomplished, for example, through any suitable electronic signature protocol. In some embodiments, the document could be printed, signed, and scanned to provide a signed version of the document.

An electronic signature can also be accomplished via one or more customer selectable icons where the selection of one of the icons by the customer indicates their electronic signature. Such an embodiment could be accomplished, for example, by segmenting the display into multiple portions to display a document sent from the customer service representative and one or more customer selectable icons to allow the customer to make a selection therefrom and wherein the document and the one or more icons are regarding a subject being discussed via the phone by the customer service representative and the customer and wherein one of the icons indicates the customer's acceptance of the terms of the document being signed.

In various embodiments, executable instructions can be used for receiving the signed document with one of the number of customer service representative computing devices and routing the document back to a particular computing device of the customer service representative during the period of the phone based customer service representative interaction.

Figure 2C:
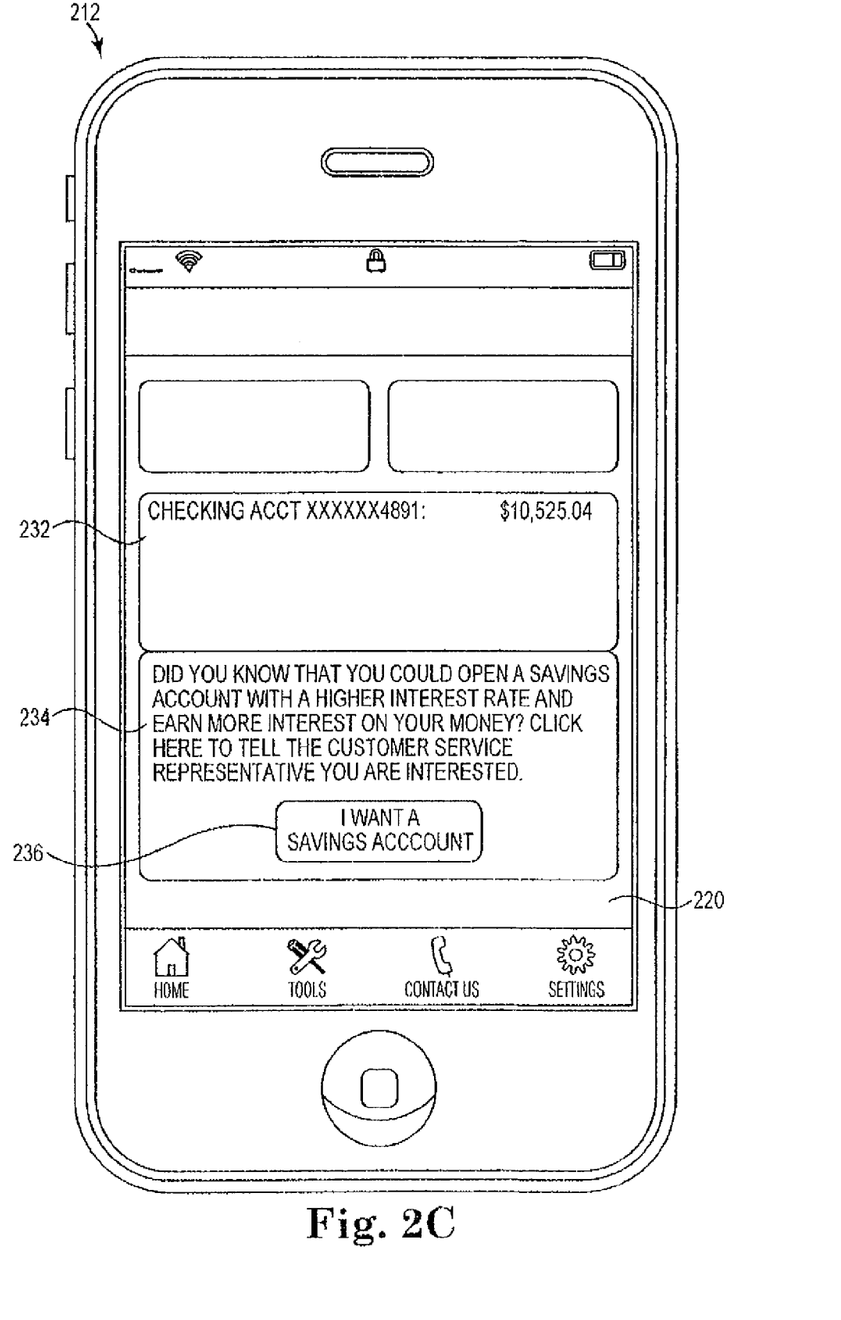
FIG. 2C illustrates a display of a user device having another set of information provided in accordance with one or more embodiments of the present disclosure.

FIG. 2C illustrates a display of a user device having another set of information provided in accordance with one or more embodiments of the present disclosure. In the example presented in FIG. 2C, the display 220 of the device 212 has again been bifurcated with the upper portion 232 providing general information about the product being discussed or to be discussed (in this case a banking product) between the customer and the customer service representative.

The lower portion 234 of the display 220 provides information about another product that may be of interest to the customer. For example, the customer service representative may have seen the large balance in the customer's account and may have selected information regarding an alternative, additional, or supplemental account that is to be sent to the customer's computing device 212. In some embodiments, executable instructions may initiate the sending of this information to the customer either automatically, through examination of the customer's account data, or at the initiation of the customer service representative.

In the embodiment illustrated in FIG. 2C, the offer of an additional product also includes a selection indicator icon 236 (e.g., button) to allow the customer to indicate to the customer service representative that they would be interested in the other product or would like more information about the other product.

In this example, if the customer clicks the button, an indication is sent to the customer service representative that they should discuss the other account with the customer during the phone interaction. The customer service representative can, in some embodiments, also select information about the other account to be sent to the computing device of the customer to be displayed thereon. This may be beneficial, for example, because the customer can review the information while the customer service representative is handling other tasks with regard to the subject matter being discussed thereby reducing the amount of time the interaction may take, among other benefits.

Figure 2D:
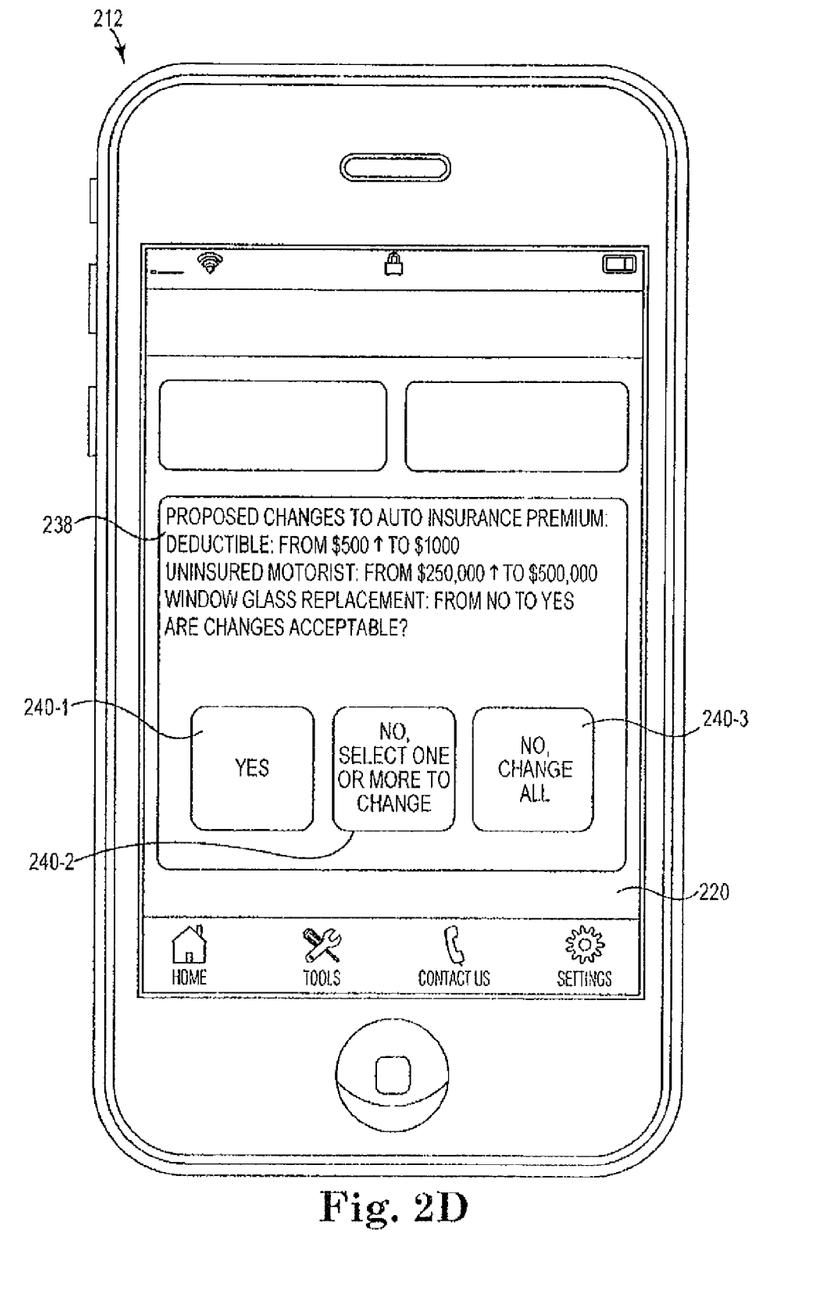
FIG. 2D illustrates a display of a user device having another set of information provided in accordance with one or more embodiments of the present disclosure.

FIG. 2D illustrates a display of a user device having another set of information provided in accordance with one or more embodiments of the present disclosure. In this example, the display 220 of device 212 provides a summary 238 of changes discussed to an insurance product.

This may be beneficial, for example, because it may allow the customer to more easily ascertain the scope of the changes being made than if the changes had been recited via phone by the customer service representative. Additionally, the example provides a number of buttons that can be selected by the customer to allow the customer to accept the changes 240-1, adjust one or more of the changes 240-2, or adjust all of the changes proposed 240-3.

The selection by the customer can initiate the sending of a message regarding the decision of the customer to the customer service representative so that they can determine what action should be taken next regarding the proposed changes. Such functionality can allow the customer to make the selections and/or allow the customer service representative to potentially record the acceptance of the proposed changes should any issue arise regarding their acceptance, among other benefits.

Figure 3:
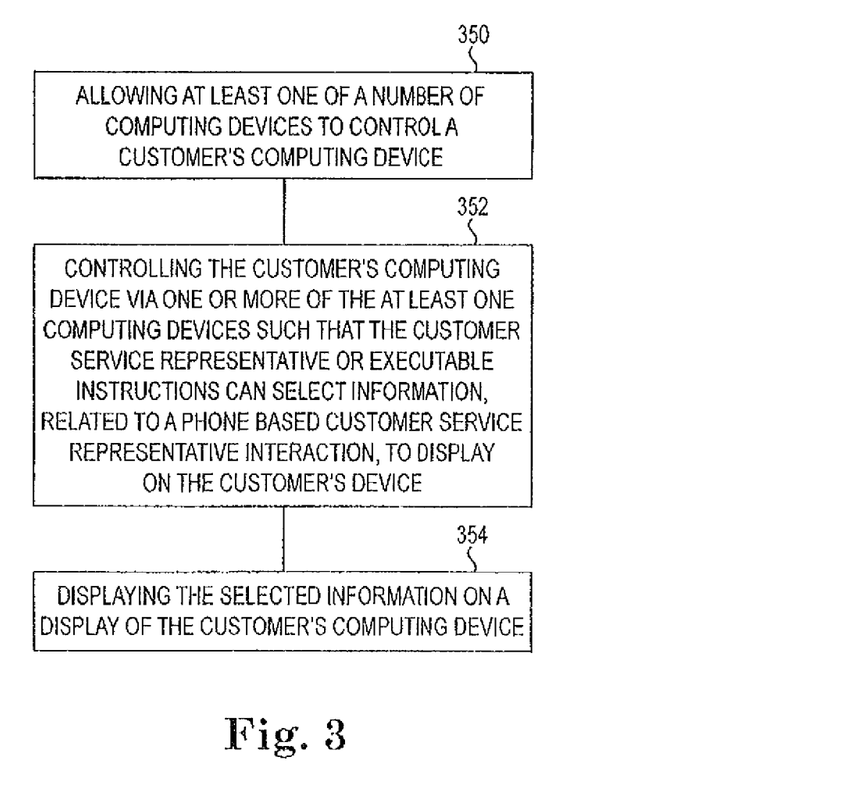
FIG. 3 illustrates a method according to one or more embodiments of the present disclosure.

FIG. 3 illustrates a method according to one or more embodiments of the present disclosure. The method can be performed by a system, such as, for example, system 100 previously described in connection with FIG. 1.

The embodiment of FIG. 3 includes allowing at least one of a number of computing devices to control a customer's computing device at block 350. Such functionality and how it could be accomplished is discussed above with respect to FIG. 1. This functionality allows the customer service representative or executable instructions to select and send information to the customer's computing device to be displayed thereon, as previously described herein.

In block 352, the method includes, controlling the customer's computing device via one or more of the at least one computing devices such that the customer service representative or executable instructions can select information, related to a phone based customer service representative interaction, to display on the customer's device. The method of FIG. 3 also includes displaying the selected information on a display of the customer's computing device, at block 354.

In some embodiments, methods can include receiving information from the customer's computing device indicating a selection has been made by the customer regarding a subject being discussed via the phone by the customer service representative and the customer. In some method embodiments, the method includes initiating a set of executable instructions to generate one or more icons on the display of the customer's computing device to allow the customer to make one or more selections regarding a subject being discussed via the phone by the customer service representative and the customer. One such example of these functionalities is provided and discussed with respect to FIG. 2D.

In various embodiments, a method can include initiating a set of executable instructions to send a document to the customer's computing device to allow the customer to review the document regarding a subject being discussed via the phone by the customer service representative and the customer. Some method embodiments can include initiating a set of executable instructions to send a document to the customer's computing device to allow the customer to review and sign the document regarding a subject being discussed via the phone by the customer service representative and the customer and for receiving with one of the number of computing devices and routing the document back to a computing device of the customer service representative during the period of the phone based customer service representative interaction. One such example of these functionalities is provided and discussed with respect to FIG. 2D.

Figure 4:
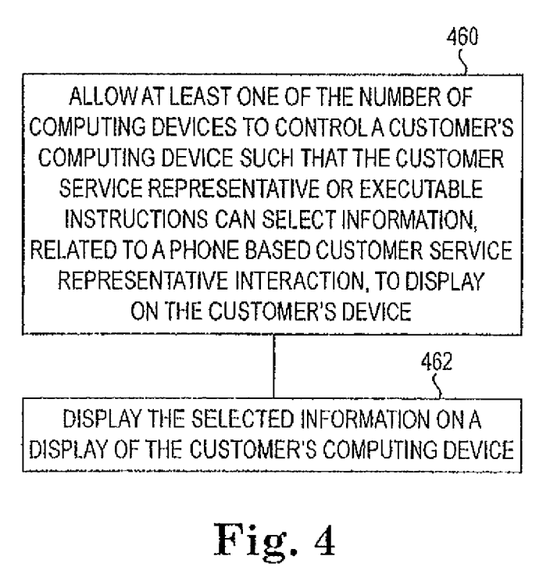
FIG. 4 illustrates another method according to one or more embodiments of the present disclosure.

FIG. 4 illustrates another method according to one or more embodiments of the present disclosure. As with the method of FIG. 3, this method can be performed by a system, such as, for example, system 100 previously described in connection with FIG. 1.

The embodiment of FIG. 4 includes allowing at least one of the number of computing devices to control a customer's computing device such that the customer service representative or executable instructions can select information, related to a phone based customer service representative interaction, to display on the customer's device, at block 460. The method also includes displaying the selected information on a display of the customer's computing device, at block 462.

In some embodiments, the selected information can be one or more advertisements for additional, alternative, supplemental products or products unrelated to the product being discussed via the phone interaction. As used herein, the term product can include any suitable item or service that would benefit from a customer service availability for customers.

For example, in some embodiments, advertisements can be sent to the customer's computing device during a wait time to speak with a customer service representative (e.g., queue time) to utilize the queue time to play advertisements while the customer waits for a customer service representative to answer their phone or come back on the line if they have put the customer on hold.

For example, if the customer selects to speak with a customer service representative and the message that is played states that the hold time is 5 minutes, during that time while the customer waits one or more advertisements can be presented to the customer. In some embodiments, an ad could be presented and the customer may have the capability to "Like" or select ask for more information for products offered so that by the time the customer service representative answers the line and they are done assisting the customer with the issue that was the initial point of the phone interaction, the customer service representative could reference the "Liked" product for discussion and a potential acquisition of the product by the customer.

In some embodiments the information provided to the customer's computing device can be selected based upon customer information stored in one or more computing devices accessible by the customer service representative. For example, the information could be stored on devices 102 and/or 108-1, 108-2, . . . and/or 108-N and accessed by the customer service representative via computing device 102.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for computing device assistance for phone based customer service representative interaction, comprising:
    a number of customer service representative computing devices, wherein at least one of the number of customer service representative computing devices is configured to:
        control a customer's computing device such that the customer service representative can select information related to a phone based customer service representative interaction to display on the customer's computing device; and
        cause display of the selected information on a display of the customer's computing device, wherein the selected information includes one or more icons to allow the customer to make a selection of one or more actions that can be taken during the phone based customer service representative interaction.

2. The system of claim 1, wherein the at least one of the number of customer service representative computing devices is configured to:
    send a document regarding a subject being discussed via the phone based customer service representative interaction to the customer's computing device to allow the customer to review and sign the document; and
    receive the document back during the phone based customer service representative interaction.

3. The system of claim 1, wherein the at least one of the number of customer service representative computing devices is configured to cause the display of the selected information on the display of the customer's computing device while the customer has been put on hold by the customer service representative during the phone based customer service representative interaction.

4. The system of claim 1, wherein the at least one of the number of customer service representative computing devices is configured to cause the display of the selected information on the display of the customer's computing device during a wait time to speak with the customer service representative.

5. The system of claim 1, wherein the one or more icons provide information regarding the phone based customer service representative interaction.

6. The system of claim 1, wherein the one or more icons allow the customer to make a selection of a nature of communication during the phone based customer service representative interaction.

7. The system of claim 1, wherein the one or more icons allow the customer to make a selection of a product the customer is interested in and/or would like more information about.

8. The system of claim 7, wherein the at least one of the number of customer service representative computing devices is configured to, in response to the selection of the product:
    send an indication to the customer service representative to discuss the product during the phone based customer service representative interaction;
    allow the customer service representative to make a selection of information about the product; and
    send the selected information about the product to the customer's computing device.

9. The system of claim 1, wherein the one or more icons include one or more buttons.

10. A method of using a computing device interaction to assist with a phone based customer service representative interaction, comprising:
    allowing at least one of a number of computing devices to control a customer's computing device;
    controlling the customer's computing device via the at least one computing device such that a customer service representative can select information related to a phone based customer service representative interaction to display on the customer's computing device;
    displaying the selected information on a display of the customer's computing device; and
    sending a document regarding a subject being discussed via the phone based customer service representative interaction to the customer's computing device to allow the customer to review and sign the document.

11. The method of claim 10, wherein the method includes receiving the document and routing the document back to the at least one computing device during the phone based customer service representative interaction.

12. The method of claim 10, wherein the selected information includes one or more icons to allow the customer to make a selection of one or more actions that can be taken during the phone based customer service representative interaction.

13. The method of claim 10, wherein the method includes allowing the customer to interact with the selected information displayed on the display of the customer's computing device.

14. The method of claim 10, wherein the method includes:
    segmenting the display of the customer's computing device into a plurality of portions; and
    displaying the document on the display of the customer's computing device in one of the plurality of portions.

15. The method of claim 14, wherein the method includes displaying the selected information on the display of the customer's computing device in a different one of the plurality of portions.

16. A non-transitory machine readable medium having a set of machine executable instructions stored thereon for execution by a processor to cause a machine to:
    allow at least one of a number of customer service representative computing devices to control a customer's computing device such that a customer service representative can select information, related to a phone based customer service representative interaction, to display on the customer's computing device;

cause a display of the selected information on a display of the customer's computing device;

send a document regarding a subject being discussed via the phone based customer service representative interaction to the customer's computing device to allow the customer to review and sign the document; and receive the document with one of the number of customer service representative computing devices and route the document back to a computing device of the customer service representative during the phone based customer service representative interaction.

17. The medium of claim 16, wherein the selected information includes one or more advertisements for one or more products.

18. The medium of claim 17, wherein the one or more products include a product related to the subject being discussed via the phone based customer service representative interaction.

19. The medium of claim 17, wherein the one or more products include a product unrelated to the subject being discussed via the phone based customer service representative interaction.

20. The medium of claim 17, wherein the one or more advertisements provide the customer with a capability to ask for more information about the one or more products.

* * * * *